United States Patent
Cho et al.

(10) Patent No.: US 12,330,666 B2
(45) Date of Patent: Jun. 17, 2025

(54) METHOD, APPARATUS, AND COMPUTER PROGRAM FOR MODELING DRIVING ROUTE FOR AUTOMATIC DRIVING OF VEHICLE

(71) Applicant: RideFlux Inc., Jeju-si (KR)

(72) Inventors: Himchan Cho, Jeju-si (KR); Jiwoong Kim, Seoul (KR)

(73) Assignee: RideFlux Inc., Jeju-si (KR)

( * ) Notice: Subject to any disclaimer, the term of this patent is extended or adjusted under 35 U.S.C. 154(b) by 150 days.

(21) Appl. No.: 18/058,055

(22) Filed: Nov. 22, 2022

(65) Prior Publication Data

US 2023/0303098 A1    Sep. 28, 2023

(30) Foreign Application Priority Data

Mar. 28, 2022    (KR) .......................... 10-2022-0038129

(51) Int. Cl.
*B60W 60/00* (2020.01)
*B60W 50/06* (2006.01)
*G05B 17/02* (2006.01)
*B60W 50/00* (2006.01)

(52) U.S. Cl.
CPC .......... *B60W 50/06* (2013.01); *B60W 60/001* (2020.02); *G05B 17/02* (2013.01); *B60W 2050/0022* (2013.01)

(58) Field of Classification Search
CPC ............... B60W 50/06; B60W 60/001; B60W 2050/0022; G05B 17/02
See application file for complete search history.

(56) References Cited

FOREIGN PATENT DOCUMENTS

| | | |
|---|---|---|
| JP | 2019-043396 A | 3/2019 |
| JP | 2019-215783 A | 12/2019 |
| KR | 10-2013-0057893 A | 6/2013 |
| KR | 10-2016-0056711 A | 5/2016 |
| KR | 10-2019-0097453 A | 8/2019 |
| KR | 10-2020-0075922 A | 6/2020 |
| KR | 10-2022-0003358 A | 1/2022 |
| WO | WO91009375 A1 * | 6/1991 |
| WO | WO-03095944 A1 * | 11/2003 ............. G01C 21/32 |

OTHER PUBLICATIONS

A Notice of Allowance mailed by the Korean Intellectual Property Office on Jan. 26, 2023, which corresponds to Korean Patent Application No. 10-2022-0038129 and is related to U.S. Appl. No. 18/058,055.

* cited by examiner

*Primary Examiner* — Peter D Nolan
*Assistant Examiner* — Chanmin Park
(74) *Attorney, Agent, or Firm* — Studebaker Brackett PLLC

(57) ABSTRACT

Provided are a method, apparatus, and computer program for modeling a driving route for automatic driving of a vehicle. According to various embodiments, a method of modeling a driving route for automatic driving of a vehicle, which is executed by a computing device, includes setting a plurality of reference points; and generating a driving route for autonomous driving control of the vehicle based on positions of the plurality of set reference points, in which the generated driving route is a set of curves each corresponding to one of a straight section, a curved section and a clothoid section connecting the straight section and the curved section and is expressed as a curvature function according to displacement.

7 Claims, 7 Drawing Sheets

METHOD, APPARATUS, AND COMPUTER PROGRAM FOR MODELING DRIVING ROUTE FOR AUTOMATIC DRIVING OF VEHICLE

CROSS-REFERENCE TO RELATED APPLICATION

This application claims priority to and the benefit of Korean Patent Application No. 10-2022-0038129, filed on Mar. 28, 2022, the disclosure of which is incorporated herein by reference in its entirety.

BACKGROUND

1. Field of the Invention

Various embodiments of the present invention relate to a method, apparatus, and computer program for modeling a driving route for automatic driving of a vehicle.

2. Discussion of Related Art

For the convenience of a user driving a vehicle, various sensors and electronic devices (e.g., an advanced driver assistance system (ADAD)) are being provided, and in particular, technological development for an autonomous driving system of a vehicle is actively being conducted.

Here, in an autonomous driving system, a vehicle recognizes the surrounding environment without driver intervention and automatically drives to a given destination according to the recognized surrounding environment.

In the autonomous driving system, when an autonomous driving vehicle wants to drive from a starting point to an ending point, a driving route from the starting point to the ending point is generated based on map data, and the autonomous driving vehicle is controlled to drive according to the generated driving route.

However, since the driving route generated in the conventional autonomous driving system simply connects the starting point and the ending point to generate the driving route, dynamic characteristics of an autonomous driving vehicle driven according to the corresponding driving route may not be taken into account, and there is a problem in controlling an autonomous driving vehicle to forcibly change directions.

In addition, an autonomous driving system controls a steering system or the like based on curvature information of a driving route. When the driving route has large or frequent curvature changes, there is a problem in that the steering of the vehicle is large and frequently changed, which adversely affects riding comfort.

SUMMARY OF THE INVENTION

The present invention is to solve the problem of the autonomous driving control in the conventional autonomous driving system described above, and provides a method, apparatus, and computer program for modeling a driving route for automatic driving of a vehicle capable of improving the riding comfort of passengers of an autonomous driving vehicle by modeling a driving route including a clothoid curve upon modeling a driving route for autonomous driving control of the vehicle.

Objects of the present invention are not limited to the objects described above, and other objects that are not mentioned may be obviously understood by those skilled in the art from the following description.

The present invention may provide a method of modeling a driving route for automatic driving of a vehicle, which is executed by a computing device, including: setting a plurality of reference points; and generating a driving route for autonomous driving control of the vehicle based on positions of the plurality of set reference points, in which the generated driving route is a set of curves each corresponding to one of a straight section, a curved section, and a clothoid section connecting the straight section and the curved section and is expressed as a curvature function according to displacement.

The generating of the driving route may include: setting a plurality of parameters; and modeling a driving route function corresponding to the straight section, the curved section, and the clothoid section using the plurality of set parameters, and the number of the plurality of set parameters may be determined depending on degree of the modeled driving route function.

The modeling of the driving route function may include: calculating an error between positions of each of the plurality of set reference points and the driving route function, and correcting the plurality of set parameters by regression analysis so that the calculated error has a minimum value; and correcting the modeled driving route function using the plurality of corrected parameters.

The modeling of the driving route function may include: modeling a reference route function using the plurality of set reference points; calculating an error between the reference route function and the driving route function, and correcting the plurality of set parameters by regression analysis so that the calculated error has a minimum value; and correcting the modeled driving route function using the plurality of corrected parameters.

The calculating of the error may include calculating the error using at least one of position coordinates, an angle, and a curvature between a point on the reference route function and a point on the driving route function corresponding to the one point on the reference route function.

The modeling of the reference route function may include: estimating a reference route function in a form of a polynomial function connecting the plurality of set reference points; setting a boundary condition for the plurality of reference points according to degree of the estimated reference route function; and modeling the reference route function in the form of the polynomial function expressed as the curvature function according to the displacement by determining the estimated reference route function according to the set boundary condition.

The correcting of the plurality of set parameters may include: assigning a weight to each of the plurality of set reference points; and correcting the plurality of set parameters using the assigned weight and the calculated error.

The modeling of the driving route function may include: modeling a reference route function using the plurality of set reference points; comparing a position when the vehicle drives a predetermined distance according to the modeled reference route function and a position when the vehicle drives the predetermined distance according to the modeled driving route function to calculate an error and correcting the plurality of set parameters by regression analysis so that the calculated error has a minimum value; and correcting the modeled driving route function using the plurality of corrected parameters.

The modeling of the driving route function may further include verifying the modeled driving route function.

The method may further include: verifying whether a separation distance between the modeled driving route function and each of the plurality of set reference points is less than or equal to a preset value; and adopting the modeled driving route function as a final driving route when all the separation distances between the modeled driving route function and the plurality of set reference points are less than or equal to the preset value as a result of the verification.

The present invention may provide a computing device for performing a method of modeling a driving route for automatic driving of a vehicle, including: a processor; a network interface; a memory; and a computer program loaded into the memory and executed by the processor, in which the computer program may include: an instruction for setting a plurality of reference points, and an instruction for generating a driving route for autonomous driving control of the vehicle based on positions of the plurality of set reference points, and the generated driving route is a set of curves each corresponding to one of a straight section, a curved section, and a clothoid section connecting the straight section and the curved section and is expressed as a curvature function according to displacement.

The present invention may provide a computer program stored in a recording medium readable by a computing device for performing a method of modeling a driving route for automatic driving of a vehicle, in which the computer program is coupled to the computing device to perform the following operations of: setting a plurality of reference points; and generating a driving route for autonomous driving control of the vehicle based on positions of the plurality of set reference points, and the generated driving route may be a set of curves each corresponding to one of a straight section, a curved section, and a clothoid section connecting the straight section and the curved section and is expressed as a curvature function according to displacement.

Other specific details of the invention are contained in the detailed description and drawings.

DETAILED DESCRIPTION OF EXEMPLARY EMBODIMENTS

Figure 1:
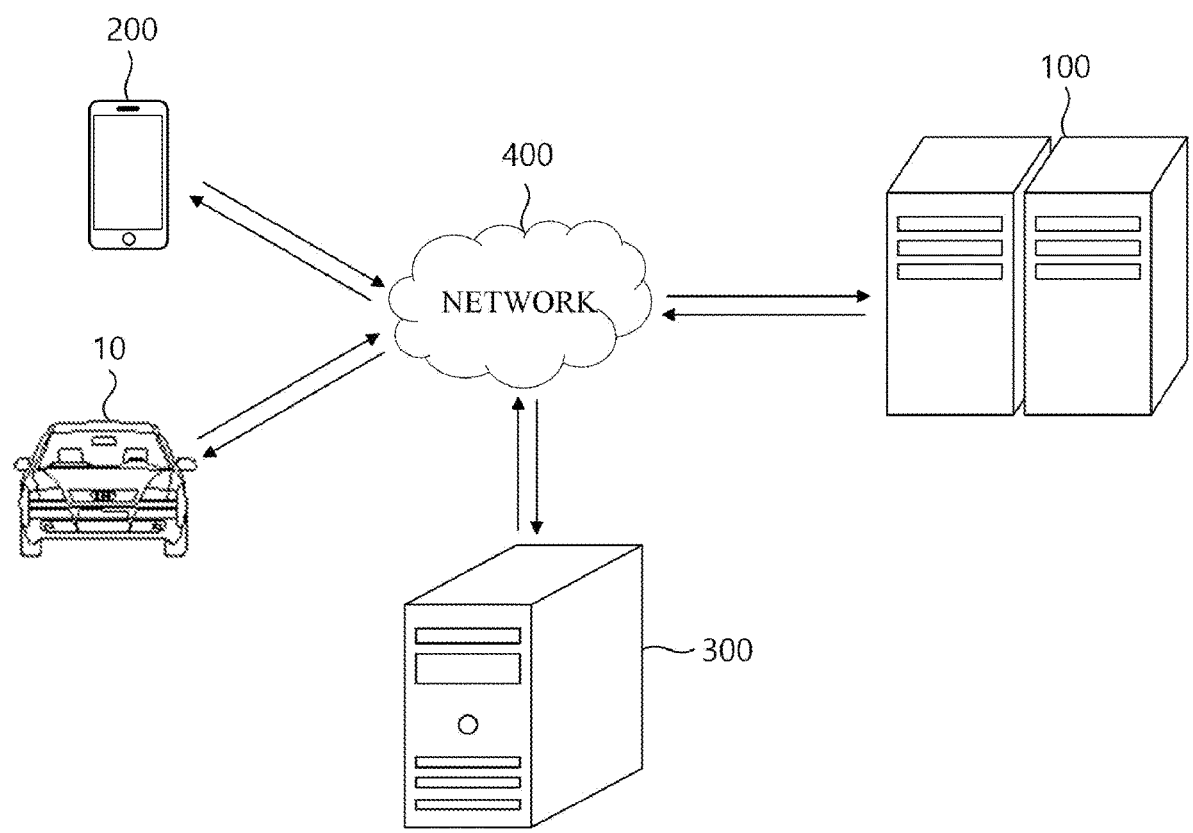
FIG. 1 is a diagram illustrating an autonomous driving system according to an embodiment of the present invention.

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. "Comprise" and/or "comprising" used in the present invention indicate(s) the presence of stated components but do(es) not exclude the presence or addition of one or more other components. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that a first component described below may be a second component within the technical scope of the present invention.

Unless defined otherwise, all terms (including technical and scientific terms) used in the present specification have the same meanings commonly understood by those skilled in the art to which the present invention pertains. In addition, terms defined in a commonly used dictionary are not ideally or excessively interpreted unless explicitly defined otherwise.

Further, the term "unit" or "module" used herein means a hardware component such as software, FPGA, or ASIC and performs predetermined functions. However, the term "unit" or "module" is not meant to be limited to software or hardware. A "unit" or "module" may be configured to be stored in a storage medium that can be addressed or may be configured to regenerate one or more processors. Accordingly, for example, a "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, "units," or "modules" may be combined into fewer components, "units," or "modules" or further separated into additional components, "units," or "modules."

Spatially relative terms "below," "beneath," "lower," "above," "upper," and the like may be used to easily describe the correlation between one component and other components as illustrated in drawings. The spatially relative terms should be understood as terms including different directions of components during use or operation in addition to the directions illustrated in the drawings. For example, in a case in which a component illustrated in the drawings is turned over, a component described as "below" or "beneath" the other component may be placed "above" the other component. Therefore, the illustrative term "below" may include both downward and upward directions. The components can also be aligned in different directions, and therefore the spatially relative terms can be interpreted according to the alignment.

In this specification, the computer is any kind of hardware device including at least one processor, and may be understood as including a software configuration which is operated in the corresponding hardware device according to the embodiment. For example, the computer may be understood as a meaning including any of a smart phone, a tablet PC, a desktop, a notebook, and user clients and applications running on any of these devices, but is not limited thereto.

Hereinafter, embodiments of the present invention will be described in detail with reference to the accompanying drawings.

Each step described in the present specification is described as being performed by a computer, but subjects of each step are not limited thereto, and according to embodiments, at least some steps can also be performed on different devices.

FIG. 1 is a diagram illustrating an autonomous driving system according to an embodiment of the present invention.

Referring to FIG. 1, the autonomous driving system according to the embodiment of the present invention may include a computing device 100, a user terminal 200, an external server 300, and a network 400.

Here, the autonomous driving system illustrated in FIG. 1 is according to an embodiment, and components of the autonomous driving system are not limited to the embodiment illustrated in FIG. 1, and may be added, changed, or omitted as necessary.

In an embodiment, the computing device 100 may measure a position and attitude of a vehicle 10 (e.g., an autonomous driving vehicle or a vehicle in which an automatic driving function is activated) and recognize the surrounding environment of the vehicle 10. For example, the computing device 100 may collect sensor data from a sensor (e.g., a light detection and ranging (LiDAR) sensor, radar sensor, camera sensor, etc.) provided inside the vehicle 10, and may utilize the collected sensor data to measure the position and attitude of the autonomous driving vehicle 10 and/or recognize the surrounding environment of the vehicle 10 by analyzing the collected sensor data.

Also, the computing device 100 may perform autonomous driving control of the vehicle 10 based on the surrounding environment of the vehicle 10 recognized according to the above method.

According to various embodiments, the computing device 100 may generate a driving route connecting a departure point (e.g., current position) and an arrival point (e.g., destination set by a user) of the vehicle 10 for the autonomous driving control of the vehicle 10, and control the vehicle 10 to perform a driving operation according to the generated driving route.

According to various embodiments, the computing device 100 may be connected to the user terminal 200 through the network 400, and may provide information on a driving route generated through the above process to the user terminal 200.

Here, the user terminal 200 may be an infotainment system provided inside the vehicle 10, but is not limited thereto. Accordingly, the user terminal 200 is a wireless communication device that ensures portability and mobility, and may be a portable terminal that a passenger riding inside the vehicle 10 may carry. Examples of the user terminal 200 may include all types of handheld-based wireless communication devices such as a navigation device, a personal communication system (PCS), global system for mobile communication (GSM), a personal digital cellular (PDC) phone, a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, and a tablet personal computer (PC), but are not limited thereto.

In addition, here, the network 400 may be a connection structure capable of exchanging information between respective nodes such as a plurality of terminals and servers. For example, the network 400 may include a local area network (LAN), a wide area network (WAN), the Internet (World Wide Web (WWW)), a wired/wireless data communication network, a telephone network, a wired/wireless television communication network, or the like.

In addition, examples of the wireless data communication network may include 3G, 4G, 5G, $3^{rd}$ Generation Partnership Project (3GPP), $5^{th}$ Generation Partnership Project (5GPP), long term evolution (LTE), world interoperability for microwave access (WiMAX), Wi-Fi, Internet, a local area network (LAN), a wireless local area network (WLAN), a wide area network (WAN), a personal area network (PAN), radio frequency, a Bluetooth network, a near-field communication (NFC) network, a satellite broadcast network, an analog broadcast network, a digital multimedia broadcasting (DMB) network, and the like, but are not limited thereto.

In one embodiment, the external server 300 may be connected to the computing device 100 through the network 400, and may store and manage various types of information and data necessary for the computing device 100 to perform a method of modeling a driving route for automatic driving of a vehicle, or store and manage various types of information and data generated by performing the method of modeling a driving route for automatic driving of a vehicle. For example, the external server 300 may be a storage server separately provided outside the computing device 100, but is not limited thereto. Hereinafter, a hardware configuration of the computing device 100 for performing the method of modeling a driving route for automatic driving of a vehicle will be described with reference to FIG. 2.

Figure 2:
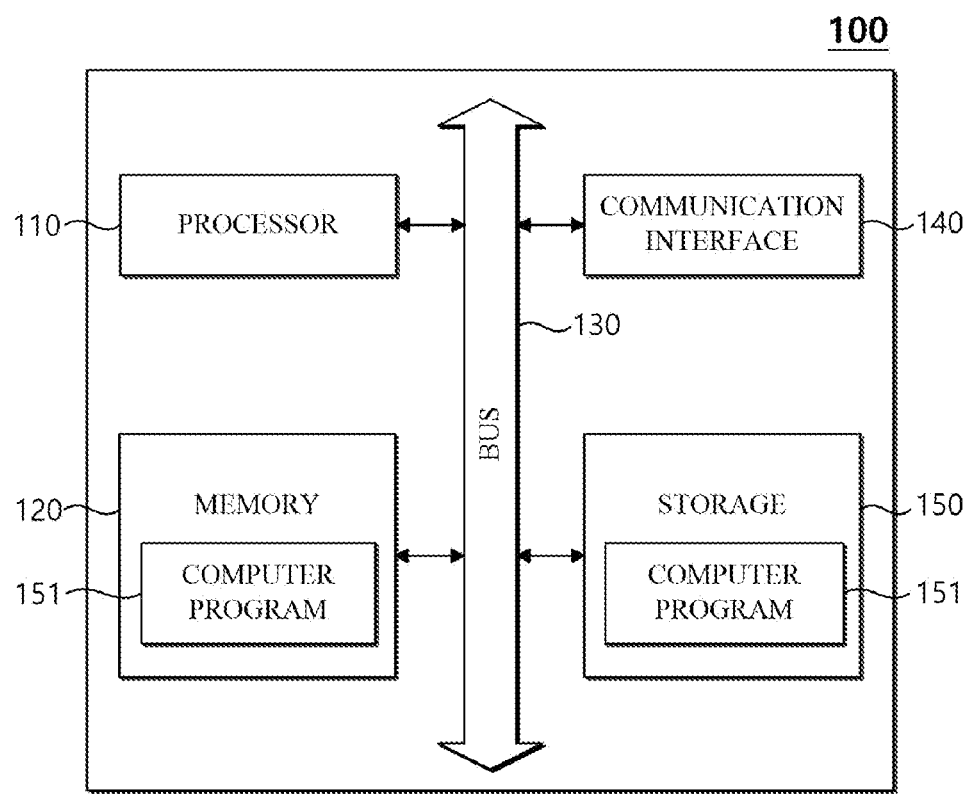
FIG. 2 is a hardware configuration diagram of a computing device for performing a method of modeling a driving route for automatic driving of a vehicle according to another embodiment of the present invention.

FIG. 2 is a hardware configuration diagram of a computing device for performing a method of modeling a driving route for automatic driving of a vehicle according to another embodiment of the present invention.

Referring to FIG. 2, according to various embodiments, the computing device 100 may include one or more processors 110, a memory 120 into which a computer program 151 executed by the processor 110 is loaded, a bus 130, a communication interface 140, and a storage 150 for storing the computer program 151. However, only the components related to the embodiment of the present invention are illustrated in FIG. 2. Accordingly, those skilled in the art to which the present invention pertains may understand that general-purpose components other than those illustrated in FIG. 2 may be further included.

The processor 110 controls an overall operation of each component of the computing device 100. The processor 110 may include a central processing unit (CPU), a micro processor unit (MPU), a micro controller unit (MCU), a graphics processing unit (GPU), or any type of processor well known in the art of the present invention.

In addition, the processor 110 may perform an operation on at least one application or program for executing the method according to the embodiments of the present invention, and the computing device 100 may include one or more processors.

According to various embodiments, the processor 110 may further include a random access memory (RAM) (not illustrated) and a read-only memory (ROM) for temporarily and/or permanently storing signals (or data) processed in the processor 110. In addition, the processor 110 may be implemented in the form of a system-on-chip (SoC) including at least one of a graphics processing unit, a RAM, and a ROM.

The memory 120 stores various types of data, commands and/or information. The memory 120 may load the computer program 151 from the storage 150 to execute methods/operations according to various embodiments of the present invention. When the computer program 151 is loaded into the memory 120, the processor 110 may perform the method/operation by executing one or more instructions constituting the computer program 151. The memory 120 may be implemented as a volatile memory such as a RAM, but the technical scope of the present disclosure is not limited thereto.

The bus 130 provides a communication function between the components of the computing device 100. The bus 130 may be implemented as various types of buses, such as an address bus, a data bus, and a control bus.

The communication interface 140 supports wired/wireless Internet communication of the computing device 100. In addition, the communication interface 140 may support various communication methods other than the Internet communication. To this end, the communication interface 140 may include a communication module well known in the art of the present invention. In some embodiments, the communication interface 140 may be omitted.

The storage 150 may non-temporarily store the computer program 151. When a process of modeling a driving route for automatic driving of a vehicle is performed through the computing device 100, the storage 150 may store various types of information necessary to provide the process of modeling a driving route for automatic driving of the vehicle.

The storage 150 may include a nonvolatile memory, such as a ROM, an erasable programmable ROM (EPROM), an electrically erasable programmable ROM (EEPROM), and a flash memory, a hard disk, a removable disk, or any well-known computer-readable recording medium in the art to which the present invention pertains.

The computer program 151 may include one or more instructions to cause the processor 110 to perform methods/operations according to various embodiments of the present invention when loaded into the memory 120. That is, the processor 110 may perform the method/operation according to various embodiments of the present invention by executing the one or more instructions.

In one embodiment, the computer program 151 may include one or more instructions to cause a method of modeling a driving route for automatic driving of a vehicle including setting a plurality of reference points and generating a driving route for autonomous driving control of the vehicle based on positions of the plurality of set reference points.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a compact disc read-only memory (CD-ROM), or in any form of computer-readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may be realized in a programming or scripting language such as C, C++, Java, and assembler, including various algorithms implemented in a combination of data structures, processes, routines, or other programming constructs. Functional aspects may be implemented in algorithms executed on one or more processors. Hereinafter, a hardware configuration of the computing device 100 performing the method of modeling a driving route for automatic driving of a vehicle will be described with reference to FIGS. 3 to 10.

Figure 3:
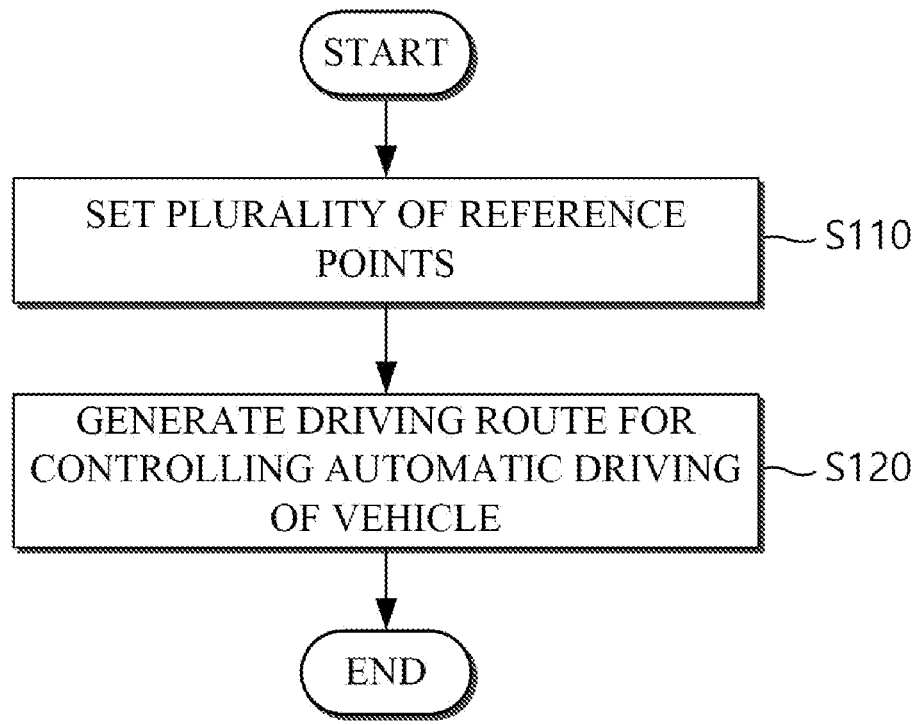
FIG. 3 is a flowchart of a method of modeling a driving route for automatic driving of a vehicle according to still another embodiment of the present invention.

FIG. 3 is a flowchart of a method of modeling a driving route for automatic driving of a vehicle according to still another embodiment of the present invention.

Referring to FIG. 3, in operation S110, the computing device 100 may set a plurality of reference points to generate the driving route of the vehicle 10.

According to various embodiments, the computing device 100 may obtain a user input indicating the plurality of reference points from a user, and may set the plurality of reference points according to the obtained user input. For example, the computing device 100 may collect map data for a predetermined area including a current position of the vehicle 10 and provide a user interface (UI) for outputting the collected map data to the user terminal 200, and obtain the user input indicating the plurality of reference points on the map data output on the display of the user terminal 200 to set the plurality of reference points.

According to various embodiments, the computing device 100 may receive a starting point and an ending point set by a user through the map data, and automatically set a plurality of intermediate points positioned between the starting point and the ending point using the set starting point and ending point.

As an example, the computing device 100 may analyze map data for a predetermined area using an image analysis model (e.g., a convolutional neural network (CNN) model, a recurrent neural network (RNN) model, or a model combining CNN and RNN models) to recognize a lane of a road connecting a starting point and an ending point and select one or more intermediate points between the starting point and the ending point based on the result of recognizing the lane of the road.

As another example, the computing device 100 may acquire attribute information on a road, such as the number of lanes, a width of a lane, a shape of the road, etc., as the result of recognizing the lane of the road, and accordingly, set one or more intermediate points (e.g., a curved section, etc.) between a starting point and an ending point. However, the present invention is not limited thereto.

In operation S120, the computing device 100 may generate the driving route based on the positions of the plurality of set reference points in operation S110.

According to various embodiments, when the driving route generated based on the plurality of reference points includes a straight section and a curved section, the computing device 100 may model a driving route function, which is a set of curves each corresponding to one of a straight section, a curved section, and a clothoid section, by modeling the curves each corresponding to one of the straight section, the curved section, and the clothoid section connecting the straight section and the curved section.

The clothoid curve has a shape similar to a trace of driving drawn by the vehicle 10 when a steering wheel of the vehicle 10 rotates at a constant speed while a speed of the vehicle 10 remains constant.

Therefore, when the driving route is modeled in the form of the clothoid curve, since a change in curvature is constant, a sharp change in a steering system of the vehicle 10 may be removed to improve the riding comfort.

According to various embodiments, the computing device 100 may set a plurality of parameters, and use the plurality of parameters to generate a modeled driving route function (hereinafter, a "driving route function") including the straight section, the curved section, and the clothoid section.

In this case, the computing device 100 may determine the number of the plurality of parameters according to degree of the driving route function.

Figure 4:
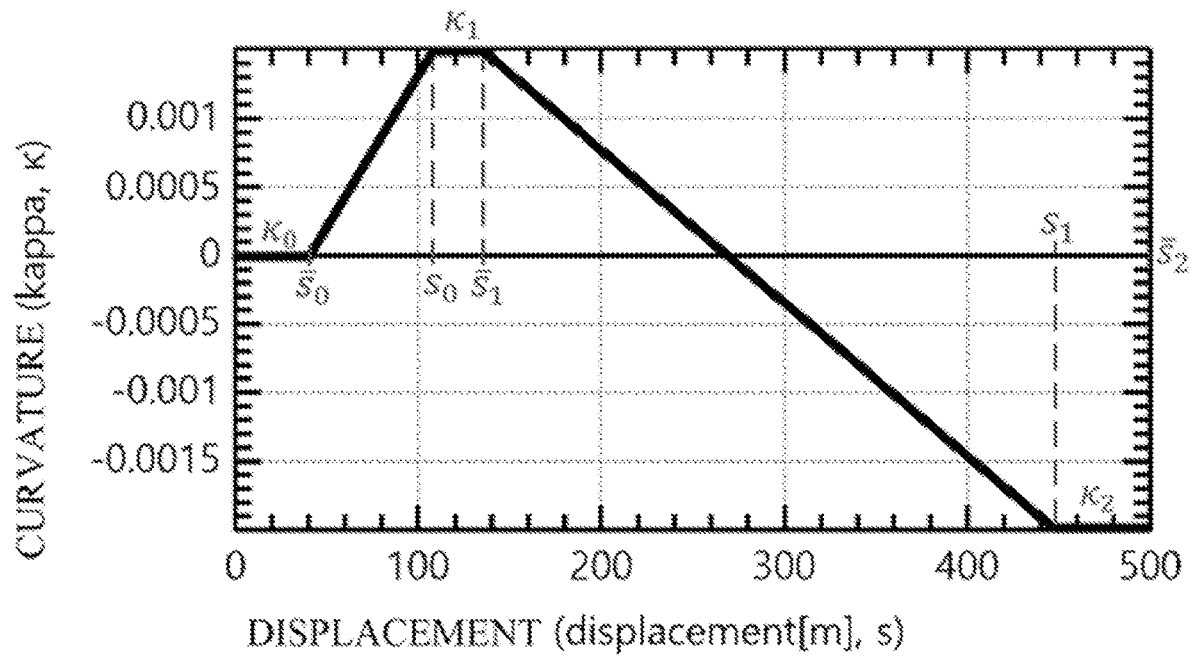
FIGS. 4 and 5 are graphs illustrating a driving route function expressed as a curvature function according to various embodiments.
Figure 5:
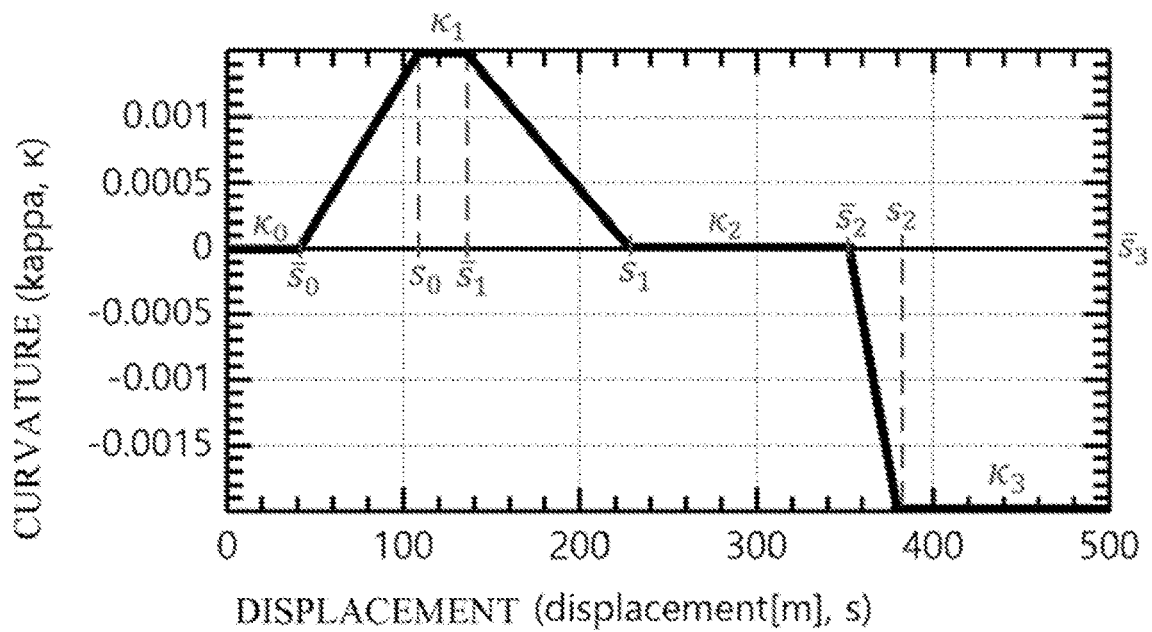

FIGS. 4 and 5 are graphs showing a driving route function expressed as a curvature k function according to displacement s. Referring to FIGS. 4 and 5, in the case of the clothoid curve, the curvature function is expressed in a linear function, that is, in a form in which a slope of the curvature according to the displacement is constant.

The number of variables required to model the driving route including the clothoid curve is 3n+5 (where n denotes the degree of the driving route function and an integer value), and when n=1 (e.g., FIG. 4), a total of eight variables ($\bar{s}_0$, $s_0$, $\bar{s}_1$ $s_1$, $\bar{s}_2$, $\kappa_0$, $\kappa_1$, $\kappa_2$) are required, while when n=2 (e.g., FIG. 5), a total of 11 variables ($\bar{s}_0$, $s_0$, $\bar{s}_1$ $s_1$, $\bar{s}_2$, $s_2$, $\bar{s}_3$, $\kappa_0$, $\kappa_1$, $\kappa_2$, $\kappa_3$) are required.

Accordingly, the computing device 100 may calculate the displacement and curvature for each of the plurality of reference points using the information (e.g., position coordinates) on the plurality of reference points, and use the calculated displacement and curvature to model the driving route including the clothoid curve. Here, various methods of calculating displacement and curvature using position coordinates of a plurality of reference points are known, and thus are not specifically limited herein.

According to various embodiments, the computing device 100 may correct the driving route function using the information on each of the plurality of reference points. Hereinafter, a method of correcting a modeled driving path function will be described with reference to FIGS. 6 to 10B.

Figure 6:
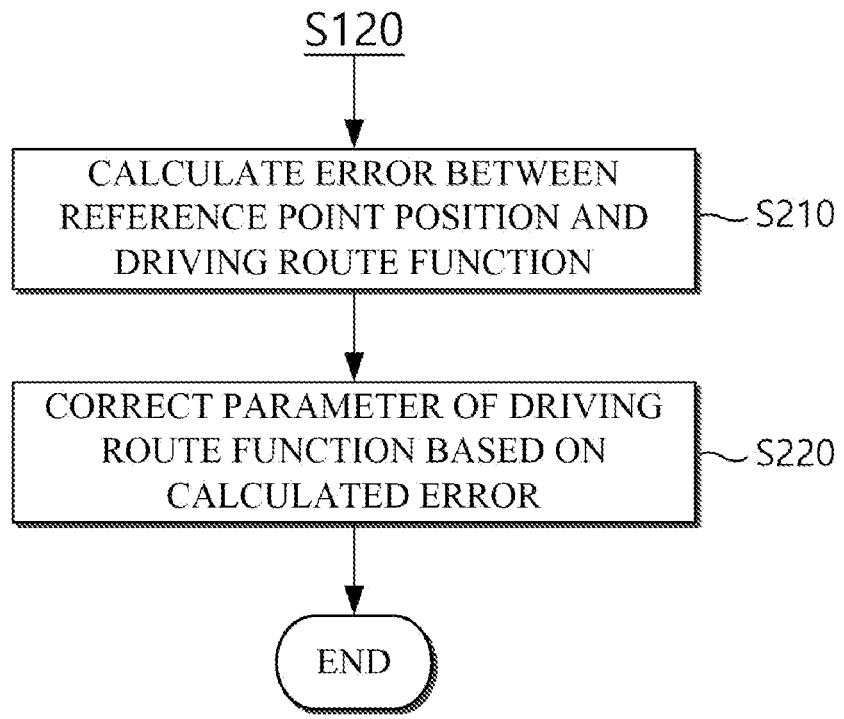
FIG. 6 is a flowchart illustrating a method of correcting a parameter of a driving route function using a position of a reference point according to various embodiments.

FIG. 6 is a flowchart illustrating a method of correcting a parameter of a driving route function using a position of a reference point according to various embodiments.

Referring to FIG. 6, according to various embodiments, the computing device 100 may correct the driving route function by comparing the position of the reference point with the driving route function.

In operation S210, the computing device 100 may compare the positions (e.g., X and Y coordinates of each of the plurality of reference points) of each of the plurality of reference points and the driving route function (e.g., X and Y coordinates of each point on the driving route corresponding to the plurality of reference points) to calculate an error.

According to various embodiments, the computing device 100 may calculate an error between the plurality of reference points and the driving route function using Equations 1 and 2 below.

$$Err_1 = R_1^T R_1 \quad \text{<Equation 1>}$$

$$R_1 = \begin{bmatrix} x_1 - \hat{x}(\hat{s}_1) \\ x_2 - \hat{x}(\hat{s}_2) \\ \dots \\ x_k - \hat{x}(\hat{s}_k) \\ y_1 - \hat{y}(\hat{s}_1) \\ y_2 - \hat{y}(\hat{s}_2) \\ \dots \\ y_k - \hat{y}(\hat{s}_k) \end{bmatrix} \quad \text{<Equation 2>}$$

Here, $Err_1$ may denote an error between a plurality of reference points and positions of points on the modeled driving route corresponding to each of the plurality of reference points, $x_1$ to $x_k$ may denote X coordinates of the plurality of reference points, $y_1$ to $y_k$ may denote Y coordinates of the plurality of reference points, $\hat{x}(\hat{s}_1)$ to $\hat{x}(\hat{s}_k)$ may denote X coordinates of the positions of the points on the modeled driving route corresponding to each of the plurality of reference points, $\hat{y}(\hat{s}_1)$ to $\hat{y}(\hat{s}_k)$ may denote Y coordinates of the positions of the points on the modeled driving route corresponding to each of the plurality of reference points, a matrix $R_1$ may denote an error matrix, and a matrix $R_1^T$ may denote a transpose matrix of the matrix $R_1$.

Here, the points on the modeled driving route corresponding to each of the plurality of reference points may be a foot of a shortest perpendicular connecting each of the plurality of reference points and the modeled driving route, but the present invention is not limited thereto.

In operation S220, the computing device 100 may correct the driving route function using the error calculated in operation S210.

According to various embodiments, the computing device 100 may correct a plurality of parameters by the regression analysis so that the error between the plurality of reference points and the driving route function has a minimum value, and correct the driving route function using the corrected plurality of parameters.

According to various embodiments, the computing device 100 may verify whether a separation distance between the driving route function and each of the plurality of reference points is less than or equal to a preset value, and as a result of the verification, adopt the modeled driving route function as a final driving route when all the separation distances between the modeled driving route function and the plurality of set reference points are less than or equal to the preset value.

According to various embodiments, the computing device 100 may correct the plurality of parameters so that the separation distances of the driving route function and each of the plurality of reference points are less than or equal to a preset value, and correct the driving route function using the plurality of corrected parameters.

Figure 7:
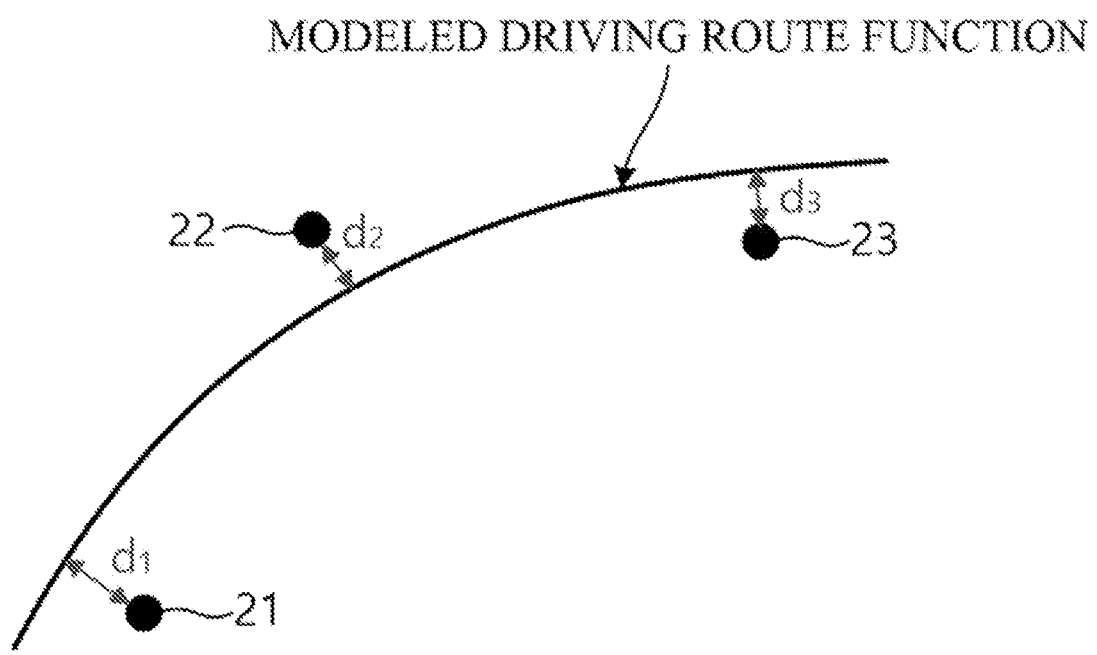
FIG. 7 is a diagram for describing a process of correcting a parameter of a driving route function according to a separation distance between a reference point and a driving route function according to various embodiments.

More specifically, referring to FIG. 7, first, the computing device 100 may calculate separation distances $d_1$, $d_2$, and $d_3$ between a plurality of reference points 21, 22, and 23 and the driving route function. Here, in the case of connecting from each of the plurality of reference points 21, 22, and 23 to the driving route function by a perpendicular, the separation distance may be a length of the connected perpendicular.

Thereafter, the computing device 100 may determine whether all of the calculated separation distances $d_1$, $d_2$, and $d_3$ are less than or equal to the preset value by comparing the calculated separation distances $d_1$, $d_2$, and $d_3$ with the preset value, and may determine the driving route function by determining parameters of a current state when all the calculated separation distances $d_1$, $d_2$, and $d_3$ are less than or equal to the preset value. Meanwhile, when at least one of the calculated separation distances $d_1$, $d_2$, and $d_3$ exceeds the preset value, the computing device 100 may correct the driving route function by correcting the parameters so that all the calculated separation distances $d_1$, $d_2$, and $d_3$ are less than or equal to the preset value.

Here, in performing the operation of correcting the parameters so that all the calculated separation distances $d_1$, $d_2$, and $d_3$ are less than or equal to the preset value, when the calculated separation distances $d_1$, $d_2$, and $d_3$ are corrected to be 0, the driving route function may be corrected to necessarily pass through the reference points. However, the driving route function may be corrected to necessarily pass through the reference points, and thus may be corrected to have a sharply changing curvature, which may adversely affect the riding comfort. As a result, the parameters may be corrected so that all the calculated separation distances $d_1$, $d_2$, and $d_3$ are less than or equal to the preset value within the range in which the shape of the clothoid curve included in the driving route function is maintained.

According to various embodiments, the computing device 100 may correct a plurality of parameters so that a maximum value (e.g., a maximum value of curvature) of the driving route function is less than or equal to a preset value, and correct the driving route function using the plurality of corrected parameters.

According to various embodiments, the computing device 100 may correct the plurality of parameters so that a maximum slope value (e.g., maximum slope of a curvature function) of the driving route function is less than or equal to the preset value, and correct the driving route function using the plurality of corrected parameters.

Figure 8:
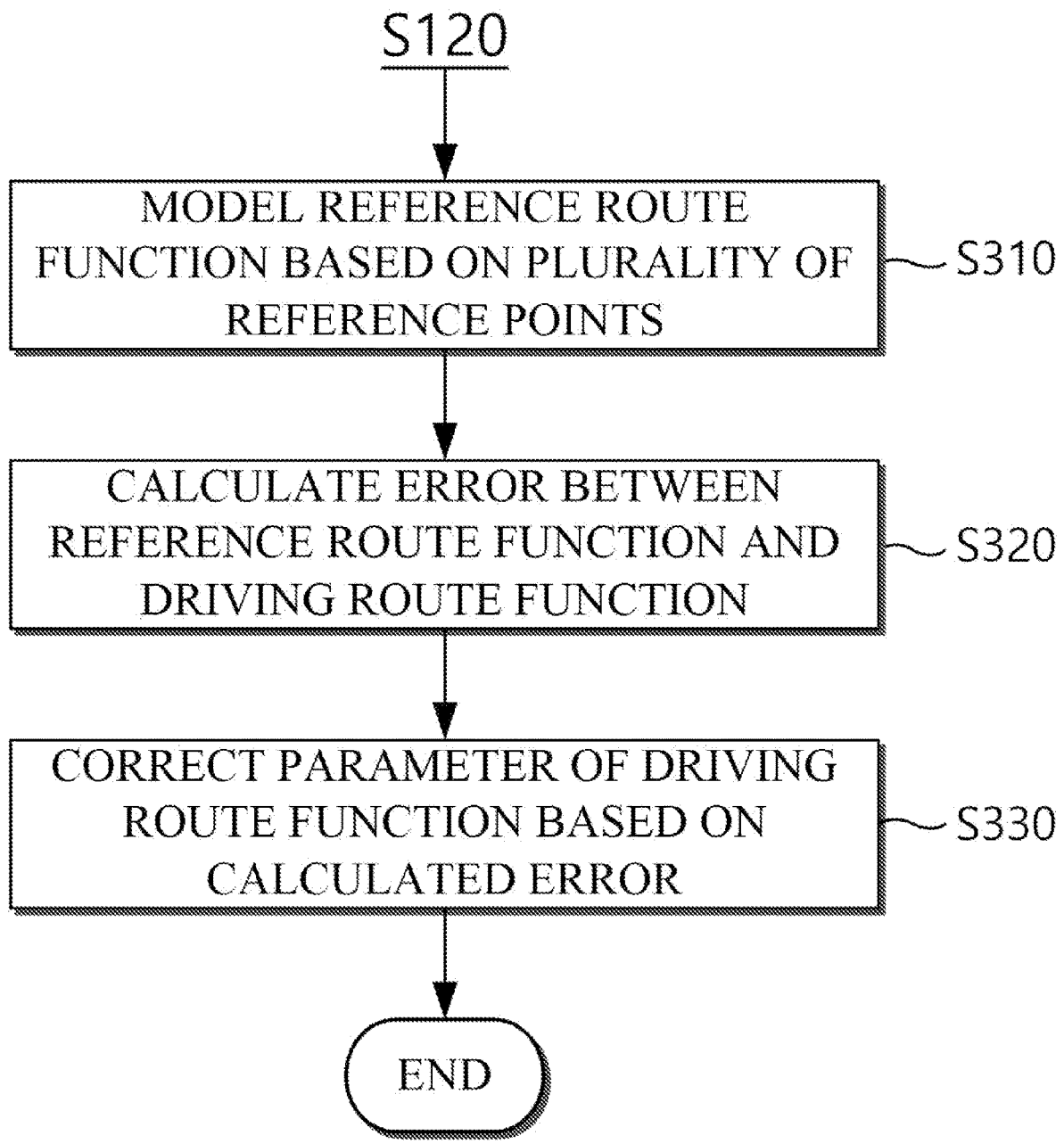
FIG. 8 is a flowchart for describing a method of correcting a parameter of a driving route function using a reference route function according to various embodiments.

FIG. 8 is a flowchart for describing a method of correcting a parameter of a driving route function using a reference route function according to various embodiments.

Referring to FIG. 8, according to various embodiments, the computing device 100 may correct the driving route function by comparing the reference route function with the driving route function.

In operation S310, the computing device 100 may model the reference route function using the plurality of reference points.

According to various embodiments, the computing device 100 may generate a reference route curve connecting two reference points disposed at mutually adjacent positions with respect to the plurality of reference points and connect the generated reference route curves, thereby generating the modeled reference route function (hereinafter, "reference route function") which is a set of the plurality of reference route curves.

Here, the plurality of reference route curves included in the reference route function may be a polynomial function, but are not limited thereto, and various types of reference route curves such as a circular arc and an elliptical arc may be generated.

More specifically, first, for each of the plurality of reference points, the computing device 100 may estimate the reference route function in the form of the polynomial function connecting two adjacent reference points.

In this case, the computing device 100 may set a boundary condition for two reference points according to the degree of the estimated reference route function, and may determine the reference route function using the boundary condition for the two reference points.

First, when the reference route function connecting the two reference points is in the form of a cubic polynomial function as shown in Equation 3 below, the computing device 100 may set six boundary conditions (e.g., position coordinates (e.g., X and Y coordinates, angle, and curvature) for each of the two reference points) to estimate the parameters of the cubic polynomial function.

$$f(s) = \kappa = as^3 + bs^2 + cs + d \qquad \text{<Equation 3>}$$

Here, f(s) may denote the reference route function, K may denote the curvature, and S may denote the displacement.

Thereafter, the computing device 100 may determine the reference route function by substituting the six boundary conditions, the position coordinates (e.g., X and Y coordinates) for each of the two reference points, and a driving direction (e.g., θ) of the vehicle 10 when the vehicle 10 is positioned at each of the two reference points, and the curvature k of the two reference points into the reference route function.

In operation S320, the computing device 100 may calculate an error by comparing the reference route function with the driving route function generated in operation S320.

According to various embodiments, the computing device 100 may set an arbitrary position on the reference route function, and may calculate an error by comparing arbitrary positions set on the reference route function with positions on the driving route function corresponding to the arbitrary positions. For example, the arbitrary position (e.g., reference point) set on the reference route function may be compared with the position of the foot of the perpendicular that is dropped on the driving route function at the corresponding position, but the present invention is not limited thereto.

That is, when the reference route function is used, the information on the angle θ and curvature k may be acquired in addition to the positions (e.g., X and Y coordinates) of the reference point. Accordingly, in comparing the reference point with the driving route function, the angle and curvature information may be compared together in addition to the position, and at least one of the position, angle, and curvature may be used to calculate an error. When modeling the driving route using the information, there is an advantage of lowering the computational difficulty. In addition, since obtaining the reference curve using the boundary condition of the reference point is a relatively simple operation, modeling the driving route through the reference curve may help to reduce the overall amount of computation and the computation time.

According to various embodiments, the computing device 100 may calculate an error by comparing the arbitrary positions set on the reference route function with the positions on the driving route function corresponding to the arbitrary positions using Equations 4 and 5 below.

$$Err_2 = R_2^T R_2 \qquad \text{< Equation 4 >}$$

$$R_2 = \begin{bmatrix} x_1(s_1) - \hat{x}(\hat{s}_1) \\ x_2(s_2) - \hat{x}(\hat{s}_2) \\ \vdots \\ x(s_k) - \hat{x}(\hat{s}_k) \\ y(s_1) - \hat{y}(\hat{s}_1) \\ y(s_2) - \hat{y}(\hat{s}_2) \\ \vdots \\ y(s_k) - \hat{y}(\hat{s}_k) \end{bmatrix} \qquad \text{< Equation 5 >}$$

Here, $Err_2$ may denote the error between the plurality of arbitrary positions and the positions on the driving route function corresponding to the plurality of arbitrary positions, $x(s_1)$ to $x(s_k)$ and $y(s_1)$ to $y(s_k)$ may denote the X and Y coordinates of the plurality of arbitrary positions, $\hat{x}(\hat{s}_1)$ to $\hat{x}(\hat{s}_k)$ and $\hat{y}(\hat{s}_1)$ to $\hat{y}(\hat{s}_k)$ may denote the X and Y coordinates of the positions on the driving route function corresponding to the plurality of arbitrary positions, a matrix $R_2$ may denote an error matrix, and a matrix $R_2^T$ may denote a transpose matrix of the matrix $R_2$.

In operation S330, the computing device 100 may correct the driving route function using the error calculated in operation S320.

According to various embodiments, the computing device 100 may correct a plurality of parameters by the regression analysis so that the error between the arbitrary position set on the reference route function and the position when the vehicle 10 drives according to the driving route function by the distance when the vehicle 10 drives to the arbitrary position according to the reference route function has a minimum value, and correct the driving route function using the plurality of corrected parameters.

According to various embodiments, the computing device 100 may calculate an error by comparing the position when the vehicle 10 drives a predetermined distance according to the reference route function with the position when the vehicle drives a predetermined distance according to the driving route function, that is, the position when the vehicle 10 drives the same distance according to the reference route function and the driving route function, and correct the driving route function using the calculated error.

More specifically, first, the computing device 100 may calculate an error by comparing the position when the vehicle 10 drives a predetermined distance according to the reference route function with the position when the vehicle 10 drives a predetermined distance according to the driving route function using Equations 6 and 7 below.

$$Err_3 = R_3^T R_3 \qquad \text{<Equation 6>}$$

$$R_3 = \begin{bmatrix} x(s_1) - \hat{x}(s_1) \\ x(s_2) - \hat{x}(s_2) \\ \cdots \\ x(s_k) - \hat{x}(s_k) \\ y(s_1) - \hat{y}(s_1) \\ y(s_2) - \hat{y}(s_2) \\ \cdots \\ y(s_k) - \hat{y}(s_k) \end{bmatrix} \qquad \text{<Equation 7>}$$

Here, $Err_3$ may denote the error between the position when the vehicle 10 drives the predetermined distance according to the reference route function and the position when the vehicle 10 drives the predetermined distance according to the driving route function, $x(s_1)$ to $x(s_k)$ and $y(s_1)$ to $y(s_k)$ may denote the X and Y coordinates of the position when the vehicle 10 drives a predetermined distance according to the reference route function, $\hat{x}(s_1)$ to $\hat{x}(s_k)$ and $\hat{y}(s_1)$ to $\hat{y}(s_k)$ may denote the X and Y coordinates of the position when the vehicle 10 drives a predetermined distance according to the driving route function, a matrix $R_3$ may denote an error matrix, and $R_3^T$ may denote a transpose matrix of the matrix $R_3$.

Thereafter, the computing device 100 may correct a plurality of parameters by the regression analysis so that the error between the position when the vehicle 10 drives a predetermined distance according to the reference route function and the position when the vehicle 10 drives a predetermined distance according to the driving route function has a minimum value, and correct the driving route function. That is, the computing device 100 may calculate an error by comparing the value of the reference route function and the value of the driving route function that are calculated using the same parameter and correct the driving route function using the calculated error, thereby reducing the amount of computation necessary for the error calculation and generating the driving route function with high similarity to the reference route function.

According to various embodiments, the computing device 100 may calculate an error by comparing at least one of position coordinates, an angle, and a curvature between a point on the reference route function and a point on the driving route function corresponding to the one point.

For example, the computing device 100 may calculate the error by comparing the arbitrary positions set on the reference route and a corresponding position on the driving route function with the positions on the driving route function corresponding to the arbitrary positions, and calculate the error by considering both the position coordinates and the angles of the arbitrary positions set on the reference route function and the positions on the driving route function corresponding to the arbitrary positions.

More specifically, the computing device 100 may calculate an error between attributes (e.g., position coordinates and directions (angles) for arbitrary positions) for the plurality of arbitrary positions set on the reference route and attributes for the positions on the driving route function corresponding to the plurality of arbitrary positions using Equations 8 and 9 below.

$$Err_4 = R_4^T R_4 \qquad \text{<Equation 8>}$$

$$R_4 = \begin{bmatrix} x(s_1) - \hat{x}(\hat{s}_1) \\ x(s_2) - \hat{x}(\hat{s}_2) \\ \cdots \\ x(s_k) - \hat{x}(\hat{s}_k) \\ y(s_1) - \hat{y}(\hat{s}_1) \\ y(s_2) - \hat{y}(\hat{s}_2) \\ \cdots \\ y(s_k) - \hat{y}(\hat{s}_k) \\ \theta(s_1) - \hat{\theta}(\hat{s}_1) \\ \theta(s_2) - \hat{\theta}(\hat{s}_2) \\ \cdots \\ \theta(s_l) - \hat{\theta}(\hat{s}_l) \end{bmatrix} \qquad \text{<Equation 9>}$$

Here, $Err_4$ may denote the error of the attributes for the plurality of arbitrary positions set on the reference route and the attributes for the positions on the driving route function corresponding to the plurality of arbitrary positions, $x(s_1)$ to $x(s_k)$ and $y(s_1)$ to $y(s_k)$ may denote the X and Y coordinates of the plurality of arbitrary positions, $\theta(s_1)$ to $\theta(s_l)$ may denote the angles for the plurality of arbitrary positions, $\hat{x}(\hat{s}_1)$ to $\hat{x}(\hat{s}_k)$ and $\hat{y}(\hat{s}_1)$ to $\hat{y}(\hat{s}_k)$ may denote the X and Y coordinates of the positions on the driving route function corresponding to the plurality of arbitrary positions, $\hat{\theta}(\hat{s}_1)$ to $\hat{\theta}(\hat{s}_l)$ may denote the angles for the positions on the driving route function corresponding to the plurality of arbitrary positions, a matrix $R_4$ may denote an error matrix, and $R_4^T$ may denote a transpose matrix of the matrix $R_4$.

Also, here, k may be a value smaller than l, but is not limited thereto.

The curvature k according to the displacement s of the driving route function may be expressed as a linear function or a constant function for each section as shown in Equation 10 below. To obtain position coordinates of any position on the driving route function, as shown in Equation 11, an additional integration operation using a trigonometric function needs to be performed, whereas, as shown in Equation 12, it is easier to calculate the angle (direction) through the integration of the curvature once.

$$\hat{K} = as + b \text{ or } \hat{K} = d \qquad <\text{Equation 10}>$$

$$\hat{x}(s) = \int_0^s \cos(\theta(\sigma))\,d\sigma \qquad <\text{Equation 11}>$$

$$\hat{y}(s) = \int_0^s \sin(\theta(\sigma))\,d\sigma$$

$$\hat{\theta} = \frac{1}{2}as^2 + bs + c \text{ or } \hat{\theta} = ds + e \qquad <\text{Equation 12}>$$

Accordingly, in comparing the reference route function and the driving route function using the arbitrary positions (that is, in calculating the error between the two functions), the computing device 100 has the advantage of lowering the computational difficulty by using the angle and curvature information together rather than using only the position coordinates. For example, by reducing the number of error comparison terms between the position coordinates and increasing the number of error comparison terms between the angles, it is possible to significantly reduce the amount of computation while maintaining error comparison performance.

According to various embodiments, the computing device 100 may assign a weight to each of the plurality of reference points, correct the plurality of parameters using the weight and the error, and correct the driving route function using the plurality of corrected parameters.

More specifically, the computing device 100 may calculate the weighted error using Equations 13 to 15 below.

$$Err_5 = R_5'^T R_5' \qquad <\text{Equation 13}>$$

$$R_5' = w^T R_5 \qquad <\text{Equation 14}>$$

$$R_5 = \begin{bmatrix} x(s_1) - \hat{x}(s_1) \\ x(s_2) - \hat{x}(s_2) \\ \ldots \\ x(s_k) - \hat{x}(s_k) \\ y(s_1) - \hat{y}(s_1) \\ y(s_2) - \hat{y}(s_2) \\ \ldots \\ y(s_k) - \hat{y}(s_k) \end{bmatrix}, w = \begin{bmatrix} w_1 \\ w_2 \\ \ldots \\ w_m \end{bmatrix} \qquad <\text{Equation 15}>$$

Here, $Err_5$ may denote the error between the position when the vehicle 10 drives a predetermined distance according to the reference route function and the position when the vehicle 10 drives a predetermined distance according to the driving route function, $x(s_1)$ to $x(s_k)$ and $y(s_1)$ to $y(s_k)$ may denote the X and Y coordinates of the positions when the vehicle 10 drives a predetermined distance according to the reference route function, $\hat{x}(s_1)$ to $\hat{x}(s_k)$ and $\hat{y}(s_1)$ to $\hat{y}(s_k)$ may denote the X and Y coordinates of the positions when the vehicle drives a predetermined distance according to the driving route function, $w_1$ to $w_m$ may denote weights assigned to each of the plurality of reference points, a matrix w may be a weight matrix, a matrix $w^T$ may denote a transpose matrix of the matrix w, $R_5'$ may denote a weighted error matrix, and a matrix $R_5'^T$ may be a transpose matrix of the matrix $R_5'$.

Also, here, k is an integer, m is a positive real number, and m may be 2k, or twice k.

For example, when the computing device 100 intends to generate the driving route function that needs to pass a reference point corresponding to a getting-off point where a passenger of the vehicle 10 gets off or pass near the reference point corresponding to the getting-off point by considering a specific reference point among the plurality of reference points as the getting-off point, the computing device 100 may generate a weight matrix by assigning a high weight to the reference point corresponding to the getting-off point compared to other reference points, generate a weighted error matrix by reflecting the generated weight matrix to the error matrix, and correct the driving route function so that the driving route function needs to pass the reference point corresponding to the getting-off point or pass near the reference point corresponding to the getting-off point by correcting the parameter based on the generated error matrix.

As described above, the computing device 100 may model the reference route function using the plurality of reference points and model the driving route function using the modeled reference route function, thereby modeling the driving route function faster than the method of directly using reference points.

For example, since the reference route function includes much information (e.g., angle θ and curvature κ information according to the displacement s) compared to the reference point, when the driving route function is modeled using the information, the computational difficulty is lowered compared to the method of directly using a reference point itself. In particular, since modeling the reference route function using the boundary condition of the reference point is a relatively simple computation process, compared to modeling the driving route function using the reference point, modeling the reference route function using the reference point and modeling the driving route function through the reference route function are generally advantageous in terms of the amount of computation and the computation time.

Meanwhile, correcting the driving route function by calculating the error between the reference route function and the driving route function does not correct the error between the reference route function and the driving route function so that the error becomes 0.

Figure 9A:
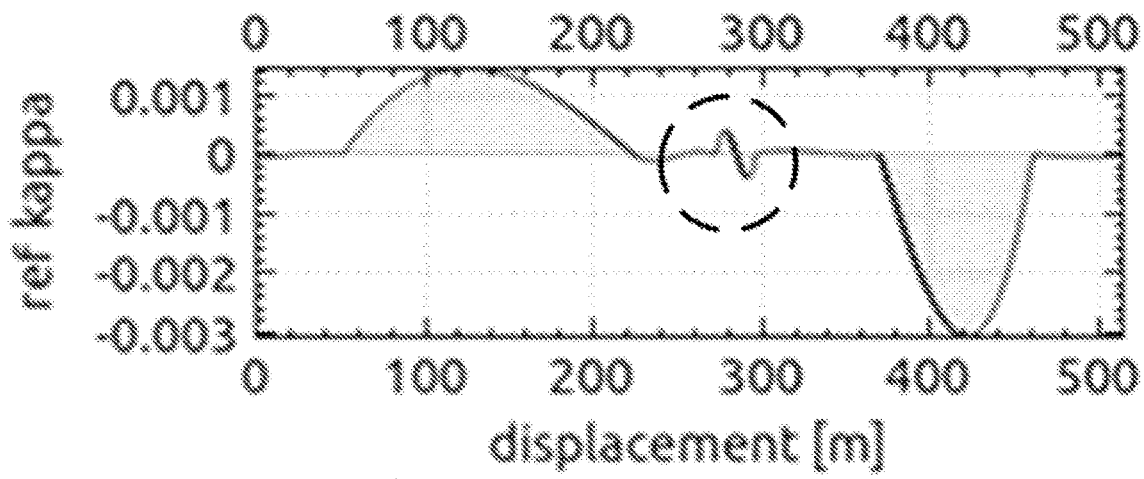
FIGS. 9A to 10B are diagrams comparing displacement-curvature graphs of a reference route function and a driving route function according to various embodiments.
Figure 9B:
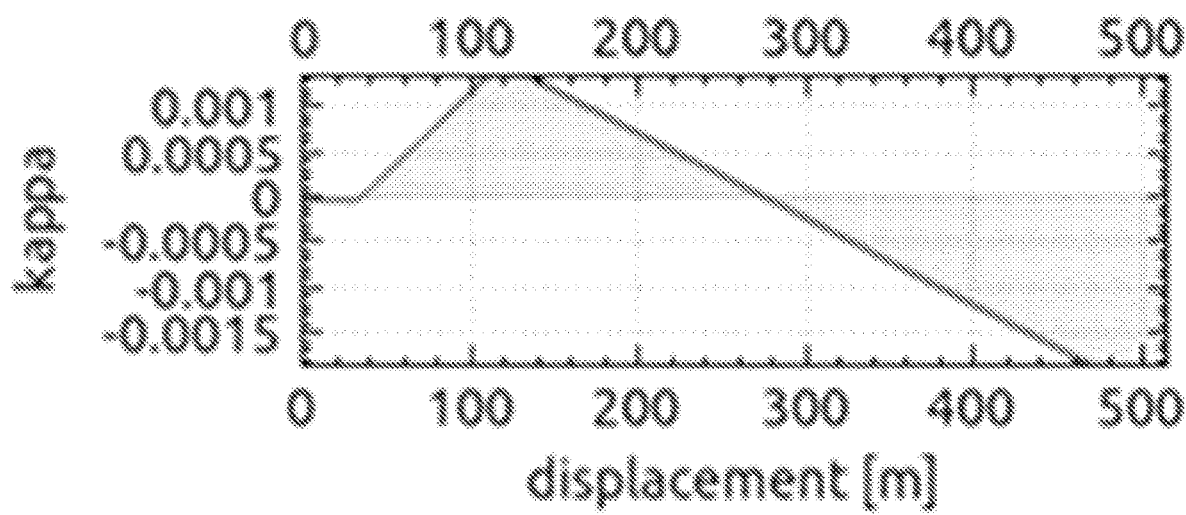
Figure 10A:
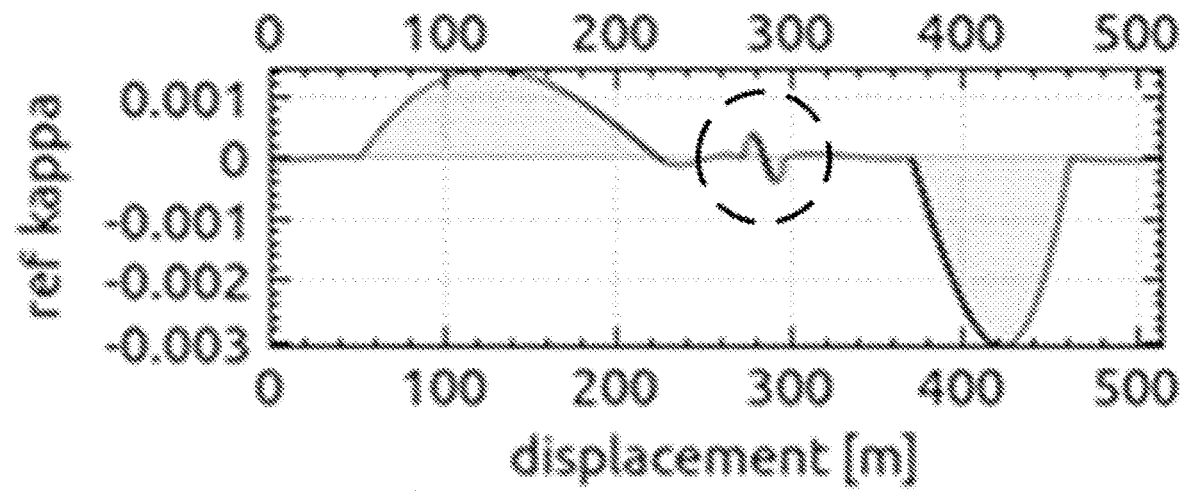
Figure 10B:
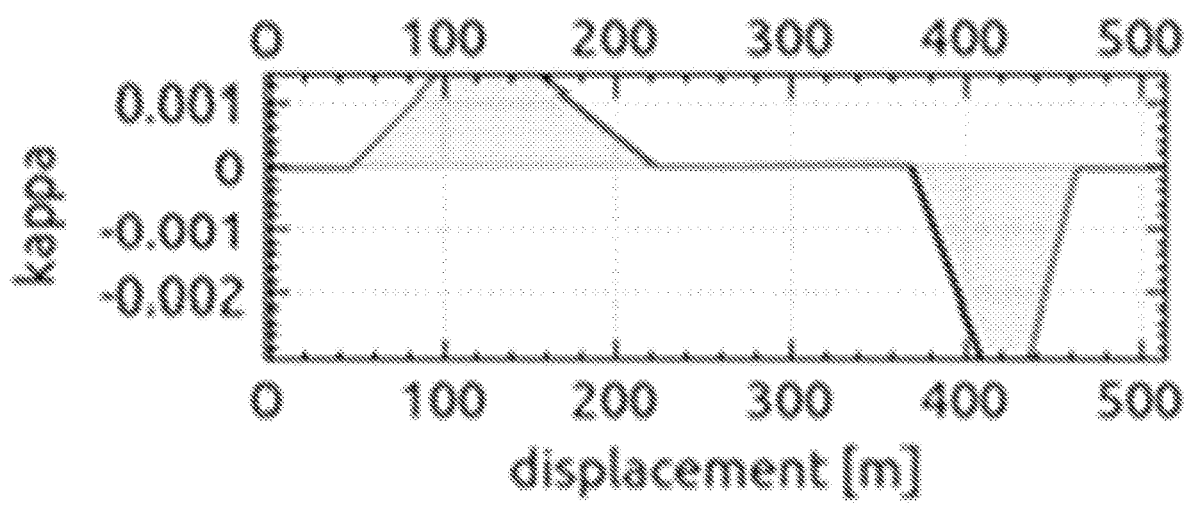

The error between the reference route function and the driving route function becoming 0 would mean that the reference route function and the driving route function had exactly the same form. In some cases, the reference route function and the driving route function may be corrected to exactly the same form, but when the reference route function and the driving route function are modeled to satisfy the boundary condition as illustrated in FIGS. 9A and 9B (when n=1) and FIGS. 10A and 10B (when n=2), the reference route function and the driving route function may be modeled to have a curvature that rapidly changes to meet the boundary condition. As a result, a portion with poor riding comfort may occur.

Therefore, in the method of modeling a driving route for automatic driving of a vehicle according to various embodiments of the present invention, generating the driving route that may maximize the riding comfort is considered first, but the driving route is generated faster by correcting the driving route function based on the reference route function.

The above-described method of modeling a driving route for automatic driving of a vehicle has been described with reference to the flowchart illustrated in the drawings. For a simple explanation, the method of modeling a driving route for automatic driving of a vehicle has been described by showing a series of blocks, but the present invention is not limited to the order of the blocks, and some blocks may be performed in an order different from that shown and performed in the present specification, or may be performed concurrently. In addition, new blocks not described in the present specification and drawings may be added, or some blocks may be deleted or changed.

According to various embodiments of the present invention, it is possible to improve the riding comfort of passengers of an autonomous driving vehicle by modeling a driving route including a clothoid curve upon modeling a driving route for autonomous driving control of the vehicle.

The effects of the present invention are not limited to the above-described effects, and other effects that are not mentioned may be obviously understood by those skilled in the art from the above detailed description.

Although embodiments of the present invention have been described with reference to the accompanying drawings, those skilled in the art will appreciate that various modifications and alterations may be made without departing from the spirit or essential feature of the present invention. Therefore, it should be understood that the above-mentioned embodiments are not restrictive but are exemplary in all aspects.

What is claimed is:

1. A method of modeling a driving route for automatic driving of a vehicle, which is executed by a computing device, the method comprising:
    setting a plurality of reference points by performing:
        collecting map data for a predetermined area including a current position of the vehicle;
        providing a user interface (UI) for outputting the collected map data to a user terminal; and
        obtaining a user input indicating the plurality of reference points on the map data output on a display of the user terminal to set the plurality of reference points;
    generating a driving route for autonomous driving control of the vehicle based on positions of the plurality of set reference points;
    controlling the vehicle to perform a driving operation according to the generated driving route,
    wherein the generated driving route is a set of curves each corresponding to one of a straight section, a curved section, and a clothoid section connecting the straight section and the curved section and is expressed as a curvature function according to displacement,
    wherein the generating of the driving route includes:
        setting a plurality of parameters; and
        modeling a driving route function corresponding to the straight section, the curved section, and the clothoid section using the plurality of set parameters,
    wherein the number of the plurality of set parameters is determined depending on degree of the modeled driving route function,
    wherein the modeling of the driving route function includes:
        modeling a reference route function using the plurality of set reference points;
        calculating an error between the reference route function and the driving route function, and correcting the plurality of set parameters by regression analysis so that the calculated error has a minimum value; and
        correcting the modeled driving route function using the plurality of corrected parameters, and
    wherein the correcting of the plurality of set parameters includes:
        assigning a weight to each of the plurality of set reference points and generating a weight matrix using the weight;
        generating an error matrix using the calculated error, and generating a weighted error matrix by reflecting the generated weight matrix to the generated error matrix; and
        correcting the plurality of set parameters using the weighted error matrix,
    wherein the modeling of the driving route function further includes verifying the modeled driving route function;
    verifying whether a separation distance between the modeled driving route function and each of the plurality of set reference points is less than or equal to a preset value; and
    adopting the modeled driving route function as a final driving route when all the separation distances between the modeled driving route function and the plurality of set reference points are less than or equal to the preset value as a result of the verification.

2. The method of claim 1, wherein the modeling of the driving route function includes:
    calculating an error between positions of each of the plurality of set reference points and the driving route function, and correcting the plurality of set parameters by regression analysis so that the calculated error has a minimum value; and
    correcting the modeled driving route function using the plurality of corrected parameters.

3. The method of claim 1, wherein the calculating of the error includes calculating the error using at least one of position coordinates, an angle, and a curvature between a point on the reference route function and a point on the driving route function corresponding to the one point on the reference route function.

4. The method of claim 1, wherein the modeling of the reference route function includes:
    estimating a reference route function in a form of a polynomial function connecting the plurality of set reference points;
    setting a boundary condition for the plurality of reference points according to degree of the estimated reference route function; and
    modeling the reference route function in the form of the polynomial function expressed as the curvature function according to the displacement by determining the estimated reference route function according to the set boundary condition.

5. The method of claim 1, wherein the modeling of the driving route function includes:
    modeling a reference route function using the plurality of set reference points;
    comparing a position when the vehicle drives a predetermined distance according to the modeled reference route function and a position when the vehicle drives the predetermined distance according to the modeled driving route function to calculate an error and correcting the plurality of set parameters by regression analysis so that the calculated error has a minimum value; and
    correcting the modeled driving route function using the plurality of corrected parameters.

6. A computing device for performing a method of modeling a driving route for automatic driving of a vehicle, the computing device comprising:
a processor;
a network interface;
a memory; and
a computer program loaded into the memory and executed by the processor,
wherein the computer program includes:
an instruction for setting a plurality of reference points by performing:
collecting map data for a predetermined area including a current position of the vehicle;
providing a user interface (UI) for outputting the collected map data to a user terminal; and
obtaining a user input indicating the plurality of reference points on the map data output on a display of the user terminal to set the plurality of reference points;
an instruction for generating a driving route for autonomous driving control of the vehicle based on positions of the plurality of set reference points;
an instruction for controlling the vehicle to perform a driving operation according to the generated driving route,
wherein the generated driving route is a set of curves each corresponding to one of a straight section, a curved section, and a clothoid section connecting the straight section and the curved section and is expressed as a curvature function according to displacement,
wherein the instruction for generating the driving route includes:
an instruction for setting a plurality of parameters; and
an instruction for modeling a driving route function corresponding to the straight section, the curved section, and the clothoid section using the plurality of set parameters,
wherein the number of the plurality of set parameters is determined depending on degree of the modeled driving route function,
wherein the instruction for modeling the driving route function includes:
an instruction for modeling a reference route function using the plurality of set reference points;
an instruction for calculating an error between the reference route function and the driving route function, and an instruction for correcting the plurality of set parameters by regression analysis so that the calculated error has a minimum value; and
an instruction for correcting the modeled driving route function using the plurality of corrected parameters, and
wherein the instruction for correcting the plurality of set parameters includes:
an instruction for assigning a weight to each of the plurality of set reference points and generating a weight matrix using the weight;
an instruction for generating an error matrix using the calculated error, and generating a weighted error matrix by reflecting the generated weight matrix to the generated error matrix; and
an instruction for correcting the plurality of set parameters using the weighted error matrix
wherein the instruction for modeling the driving route function further includes an instruction for verifying the modeled driving route function;

an instruction for verifying whether a separation distance between the modeled driving route function and each of the plurality of set reference points is less than or equal to a preset value; and
an instruction for adopting the modeled driving route function as a final driving route when all the separation distances between the modeled driving route function and the plurality of set reference points are less than or equal to the preset value as a result of the verification.

7. A non-transitory computer-readable medium having stored therein a computer program for causing a computing apparatus to execute the following operations of:
setting a plurality of reference points by performing:
collecting map data for a predetermined area including a current position of a vehicle;
providing a user interface (UI) for outputting the collected map data to a user terminal; and
obtaining a user input indicating the plurality of reference points on the map data output on a display of the user terminal to set the plurality of reference points;
generating a driving route for autonomous driving control of the vehicle based on positions of the plurality of set reference points;
controlling the vehicle to perform a driving operation according to the generated driving route,
wherein the generated driving route is a set of curves each corresponding to one of a straight section, a curved section, and a clothoid section connecting the straight section and the curved section and is expressed as a curvature function according to displacement,
wherein the generating of the driving route includes:
setting a plurality of parameters; and
modeling a driving route function corresponding to the straight section, the curved section, and the clothoid section using the plurality of set parameters,
wherein the number of the plurality of set parameters is determined depending on degree of the modeled driving route function,
wherein the modeling of the driving route function includes:
modeling a reference route function using the plurality of set reference points;
calculating an error between the reference route function and the driving route function, and correcting the plurality of set parameters by regression analysis so that the calculated error has a minimum value; and
correcting the modeled driving route function using the plurality of corrected parameters, and
wherein the correcting of the plurality of set parameters includes:
assigning a weight to each of the plurality of set reference points and generating a weight matrix using the weight;
generating an error matrix using the calculated error, and generating a weighted error matrix by reflecting the generated weight matrix to the generated error matrix; and
correcting the plurality of set parameters using the weighted error matrix,
wherein the modeling of the driving route function further includes verifying the modeled driving route function;
verifying whether a separation distance between the modeled driving route function and each of the plurality of set reference points is less than or equal to a preset value; and adopting the modeled driving route function as a final driving route when all the separation distances between the modeled driving route function and the plurality of set reference points are less than or equal to the preset value as a result of the verification.

* * * * *